United States Patent
Vo et al.

(10) Patent No.: US 12,297,885 B2
(45) Date of Patent: May 13, 2025

(54) SHOCK ISOLATOR WITH FLEXURES AND STOP MECHANISM

(71) Applicant: Raytheon Company, Arlington, VA (US)

(72) Inventors: Peter H. Vo, Tucson, AZ (US); Roger C. Esplin, Tucson, AZ (US); Richard O. Beaman, Tucson, AZ (US); Brandon Craig Barclay, Tucson, AZ (US); Michael Klensin, Tucson, AZ (US); James Paul Henderson, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 17/731,723

(22) Filed: Apr. 28, 2022

(65) Prior Publication Data

US 2023/0349442 A1 Nov. 2, 2023

(51) Int. Cl.
*F16F 15/08* (2006.01)

(52) U.S. Cl.
CPC ...... *F16F 15/08* (2013.01); *F16F 2230/0052* (2013.01)

(58) Field of Classification Search
CPC .. F16F 15/08; F16F 2230/0052; F16F 15/073; F16F 2230/34
USPC .......................................................... 267/160
See application file for complete search history.

(56) References Cited

U.S. PATENT DOCUMENTS

| | | | |
|---|---|---|---|
| 3,504,902 A * | 4/1970 | Irwin | F16F 1/40 239/265.17 |
| 8,262,051 B2 | 9/2012 | Vo et al. | |
| 9,370,865 B1 * | 6/2016 | Vangal-Ramamurthy | B25J 15/04 |
| 10,480,613 B2 | 11/2019 | Vo et al. | |
| 10,670,825 B2 | 6/2020 | Foes | |
| 2002/0178841 A1 | 12/2002 | Kobayashi | |
| 2004/0045372 A1 | 3/2004 | Liu | |
| 2016/0102724 A1 | 4/2016 | Potter | |
| 2020/0216210 A1 | 7/2020 | Corazza | |

FOREIGN PATENT DOCUMENTS

WO 2023211587 11/2023

OTHER PUBLICATIONS

International Search Report and Written Opinion for related International Application No. PCT/US2023/015714, mailed Jul. 4, 2023.

* cited by examiner

*Primary Examiner* — Xuan Lan Nguyen
(74) *Attorney, Agent, or Firm* — Schwegman Lundberg & Woessner, P.A.

(57) ABSTRACT

A shock isolator includes slots in inner and outer parts that define flexures between the parts. The slots may include inner slots and outer slots that are offset from each other around a perimeter of the inner part. The shock isolator also includes stops that provide a mechanical limit on the movement of the flexures. The stops may be posts that extend from one of the parts into holes in the other of the parts. In another embodiment that stops may be extensions from one of the parts over portions of the other of the parts. The stops help in preventing plastic bending and/or fracture of the flexures due to stress.

11 Claims, 5 Drawing Sheets

SHOCK ISOLATOR WITH FLEXURES AND STOP MECHANISM

GOVERNMENT LICENSE RIGHTS

This invention was made with Government support under W15QKN-20-F-0248 awarded by the United States Department of Defense. The Government has certain rights in this invention.

FIELD

The present disclosure is in the field of devices and methods for shock isolation.

BACKGROUND

In many applications, it is important to isolate shock and/or vibration energy forces between a structure that exhibits or generates shock and/or vibration energy, and an object or device to be isolated from such shock and/or vibration energy. In sensitive electronics applications, if shock and/or vibration energy is not appropriately attenuated, the sensitive electronics are prone to damage or faulty sensor readings.

For example, in missile seeker applications, sensors mounted at the end of the missile are typically stabilized by one or more dynamically tuned gyroscopes (e.g., two-axis gyros). However, at high amplitude shock or vibration inputs, such gyroscopes are prone to catastrophic failure of the gyroscopes mechanical rotor suspension, which causes faulty readings or damage to the sensors of the missile seeker, thereby causing the missile seeker systems to fail.

A typical device utilized to attenuate shock and/or vibration energy is an isolator. Isolators are commonly comprised of an elastomeric material (e.g., a rubber sheet or ring) that isolate sensitive electronic equipment from the vibration input source (e.g., a missile body). One problem with elastomeric materials used as isolators is that their mechanical properties (i.e., elasticity, resiliency, creep, etc.) tend to change over time during use, which can cause misalignments and ineffectiveness of shock and/or vibration energy isolation.

One alternative to elastomeric material is flexures, such as described in co-owned U.S. Pat. No. 10,480,613.

SUMMARY

A shock isolator includes flexures defined by slots, and a stop mechanism to limit deflection of the flexures.

According to an aspect of the disclosure, a shock isolator includes: an inner part having inner slots therein; an outer part around the inner part, the outer part having outer slots therein; flexures between and defined by the outer slots and the inner slots; and stops limiting movement of respective of the flexures by making contact between the inner part and the outer part.

According to an embodiment of any paragraph(s) of this summary, the stops are posts passing from one of the parts into respective holes in the other of the parts.

According to an embodiment of any paragraph(s) of this summary, contact between the posts and inner walls of the holes limits movement of the flexures.

According to an embodiment of any paragraph(s) of this summary, the posts include posts that extend outward from the inner part.

According to an embodiment of any paragraph(s) of this summary, the posts that extend outward from the inner part extend outward from inner solid portions of the inner part that are between adjacent of the inner slots.

According to an embodiment of any paragraph(s) of this summary, the posts include posts that extend inward from the outer part.

According to an embodiment of any paragraph(s) of this summary, the posts that extend inward from the outer part extend inward from outer solid portions of the outer part that are between adjacent of the outer slots.

According to an embodiment of any paragraph(s) of this summary, the holes are oversized holes, with a diameter larger than a diameter of the posts.

According to an embodiment of any paragraph(s) of this summary, the holes are slotted holes, allowing movement of the posts within the holes in a direction of elongation of the slots.

According to an embodiment of any paragraph(s) of this summary, the stops extend from one of the inner part or the outer part, to over a major surface of the other of the inner part or outer part.

According to an embodiment of any paragraph(s) of this summary, the stops include stops that extend outward from the inner part to over the outer part.

According to an embodiment of any paragraph(s) of this summary, the stops include stops that extend inward from the outer part to over the inner part.

According to an embodiment of any paragraph(s) of this summary, the inner slots are arranged end-to-end around a periphery of the inner part, with inner solid portions of the inner part between adjacent of the inner slots; and According to an embodiment of any paragraph(s) of this summary, the outer slots are arranged end-to-end around an inner boundary of the outer part, with outer solid portions of the outer part between adjacent of the outer slots.

According to an embodiment of any paragraph(s) of this summary, the inner slots and the outer slots are together circular.

According to an embodiment of any paragraph(s) of this summary, the inner slots and the outer slots are together rectangular.

According to an embodiment of any paragraph(s) of this summary, the inner slots are perimetrically offset from the outer slots.

According to an embodiment of any paragraph(s) of this summary, the inner solid portions are opposite middles of the outer slots.

According to an embodiment of any paragraph(s) of this summary, the outer solid portions are opposite middles of the inner slots.

According to an embodiment of any paragraph(s) of this summary, the inner part includes a cup on the inner part for receiving an object.

According to an embodiment of any paragraph(s) of this summary, the shock isolator further includes the object, wherein the object includes electronics.

According to an embodiment of any paragraph(s) of this summary, the outer part is a plate.

According to an embodiment of any paragraph(s) of this summary, the outer part is an annular disk.

According to an embodiment of any paragraph(s) of this summary, the inner slots are offset from the outer slots.

According to an embodiment of any paragraph(s) of this summary, the inner slots are three inner slots, and the outer slots are three outer slots.

According to an embodiment of any paragraph(s) of this summary, the shock isolator further includes damping material in the inner slots and the outer slots.

According to an embodiment of any paragraph(s) of this summary, the damping material is an elastomeric material.

According to an embodiment of any paragraph(s) of this summary, the inner part and the outer part are made of metal.

According to an embodiment of any paragraph(s) of this summary, the inner part and the outer part are portions of a single piece of continuous material.

According to an embodiment of any paragraph(s) of this summary, the stops are means for limiting movement of the flexures.

According to an embodiment of any paragraph(s) of this summary, the isolator is part of a flight vehicle.

According to an embodiment of any paragraph(s) of this summary, the flight vehicle is a missile.

According to an embodiment of any paragraph(s) of this summary, the flight vehicle is a projectile.

According to another aspect of the disclosure, a method of shock/vibration isolation includes the steps of: providing flexures between an inner part and an outer part of a shock isolator; and limiting motion of the flexures that using stops of the shock isolator.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

A shock isolator includes slots in inner and outer parts that define flexures between the parts. The slots may include inner slots and outer slots that are offset from each other around a perimeter of the inner part. The shock isolator also includes stops that provide a mechanical limit on the movement of the flexures. The stops may be posts that extend from one of the parts into holes in the other of the parts. In another embodiment that stops may be extensions from one of the parts over portions of the other of the parts. The stops help in preventing plastic bending and/or fracture of the flexures due to stress.

Figure 1:
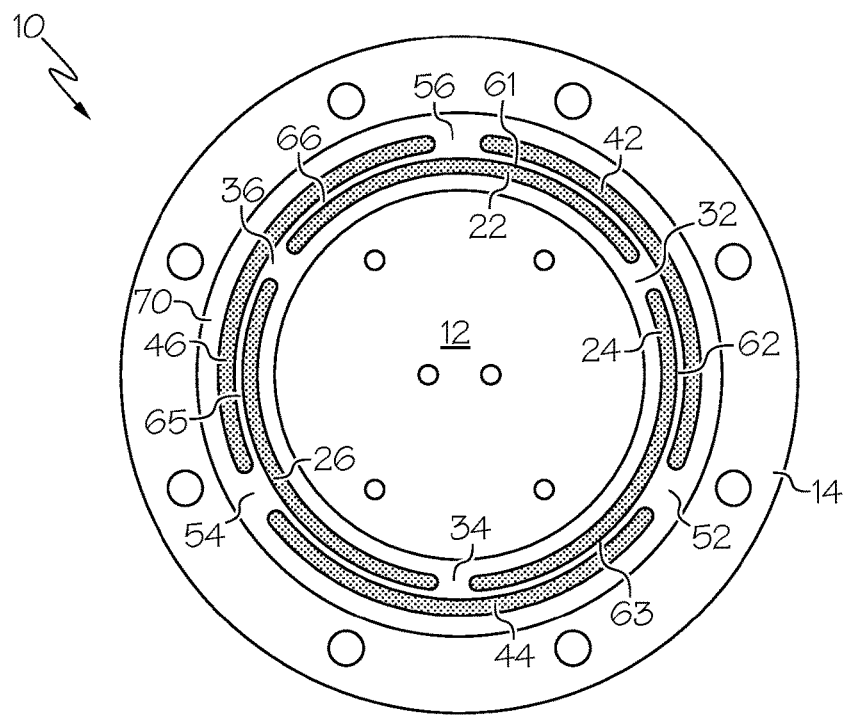
FIG. 1 is a plan view of a shock isolator according to an embodiment of the disclosure.

Referring initially to FIG. 1, a shock isolator 10 includes an inner part 12, a cup-shaped element in the illustrated embodiment, surrounded by an outer part 14, a ring in the illustrated embodiment, and more broadly a planar element. The inner part 12 may be used to mount electronics or other devices for which isolation is desired from shocks and vibrations encountered by the outer part 14.

The inner part 12 has a series of inner part slots 22, 24, and 26, spaced along an outer perimeter of the inner part 12. The inner slots 22-26 are placed end-to-end around the perimeter, with solid portions 32, 34, and 36 of the inner part 12 between adjacent of the inner slots 22, 24, and 26. All of the slots 22-26 may have the same length and similar other characteristics. However, alternatively the slots may have different lengths and/or other characteristics.

The outer part 14 also includes slots, a series of outer part slots 42, 44, and 46, spaced along an inner boundary (or perimeter) of the outer part 14. The inner slots 42-46 are placed end-to-end around the inner boundary, with solid portions 52, 54, and 56 of the outer part 14 between adjacent of the outer slots 42, 44, and 46.

The inner slots 22-26 and the outer slots 42-46 may be offset from one another, such that the outer slots 42-46 each overlap multiple of the inner slots 22-26, and the inner solid portions 32-36 are at different perimetrical (or circumferential) locations than the outer solid portions 52-56. The overlap may be such that the inner solid portions 32-36 are opposite of the middles of the outer slots 42-46, and that the outer solid portions 52-56 are opposite of the middles of the inner slots 22-26. Further, the inner slots 22-26 and the outer slots 42-46 may have corresponding (similar) lengths and other dimensions, such as width. More narrowly, all of the slots 22-26 and 42-46 may have substantially the same dimensions, such as length, width, and curvature (or location of bends). Similarly, corresponding or all of the inner solid portions 32-36 and the outer solid portions 52-56 may have substantially the same, the same, or similar dimensions. Alternatively different of the slots 22-26 and 42-46, and/or different of the solid portions 32-36 and the 52-56 may have different dimensions and/or configurations.

The slots 22-26 and 42-46 define a series of flexures 61, 62, 63, 64, 65, and 66 between the inner part 12 and the outer part 14. The flexures 61-66 are thin bands of material at which the shock isolator preferentially elastically deforms in response to accelerations, as part of isolating the inner part 12 from shocks (accelerations) encountered by the outer part 14, for instance attenuating vibrational energy. It is advantageous for all of the flexures 61-66 to have uniform (or substantially uniform) shock attenuation characteristics, and to be evenly spaced around, or at least symmetrically spaced around, the shock isolator 10. This provides for balanced attenuation of shocks (vibration energy), between the parts 12 and 14 of the isolator 10. This may make for better shock/vibration attenuation, as well as preventing damage to the flexures 61-66 that might result from uneven flexing of the flexures 61-66, and/or unevenly attenuated movements of the parts of the shock isolator 10.

As shock travels through the isolator flexures 61-66, its amplitude reduces each time it bends at an angle of 90°. Shock amplitude is also reduced by traveling through the flexure's small cross-sectional area and longer length. Desired attenuation level can be tuned with a combination of 90° bends, flexure lengths, and cross-sectional areas.

The slots 22-26 and 42-46 may be filled with an energy-attenuating or damping material 70 that aids in attenuating the shock energy encountered by the shock isolator 10. The material 70 may be an elastomeric material such as RTV silicone.

The inner part 12 and the outer part 14 may be parts of a continuous unitary single piece of homogeneous material. The material for the inner part 12 and the outer part 14 may be any of a variety of suitable materials, for example titanium, or another suitable metal.

Figure 2:
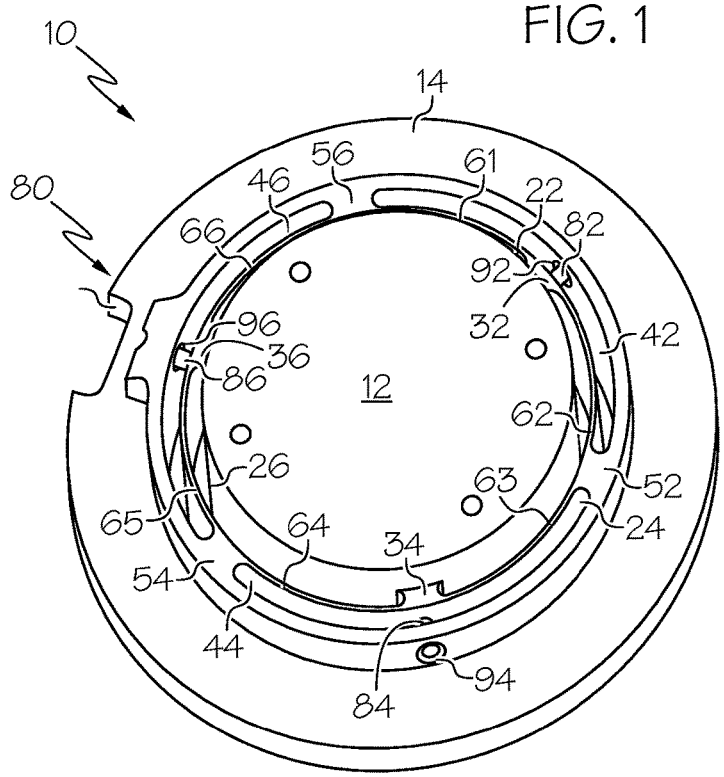
FIG. 2 is an oblique view of the shock isolator of FIG. 1, with damping material removed for illustration purposes.
Figure 3:
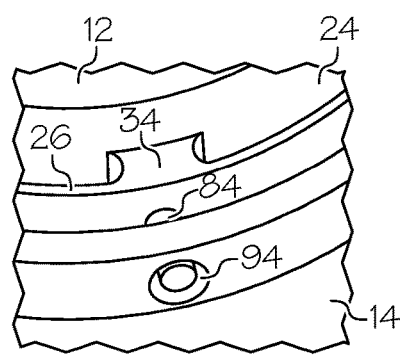
FIG. 3 is an oblique view of a portion of the shock isolator of FIG. 2, showing interaction of a post and a hole.

Referring now in addition to FIGS. 2 and 3, further details are shown in views of the shock isolator 10 with the damping material 70 (FIG. 1) removed from the slots 22-26 and 42-46 for illustration purposes.

The shock isolator 10 includes a stop mechanism 80. The stop mechanism 80 may be considered means for limiting movement of the flexures 61-66. The stop mechanism 80 may provide a mechanical limitation on the movement of the flexures 61-66, which may be advantageous in preventing fracture or other damage to the flexures 61-66.

The stop mechanisms may have any of a wide variety of configurations. In the embodiment illustrated in FIGS. 2 and 3, the stop mechanism 80 includes three stops or posts 82, 84, and 86 that extend outward from the inner solid portions 32, 34, and 36, respectively. The posts 82, 84, and 86 extend outward into respective holes 92, 94, and 96 in the outer portion 14. The holes 92-96 have diameters larger than that of the posts 82-86, allowing some movement of the posts 82-86 within the holes 92-96. However there is a limit of the movement of the posts 82-86 within the holes 92-96, such that when the posts 82-86 reach the inner walls of the holes 92-96 the engagement of the posts 82-86 with the holes 92-96 stops further relative movement. Thus the stops (or posts) 82-86 provide a limit to the movement/deflection/deformation of the flexures 61-66, preventing deformations of the flexures 61-66 that may result in breakage.

While effective for shock isolation, the flexures 61-66 are prone to fracture due to high stress at the flexure ends. This shortcoming is mitigated by adding the stop mechanism 80 to limit the flexure bending in the axial direction, hence minimizing stress at the flexure ends.

The interactions of the stops 82-86 with the holes 92-96 are described above as a group. However it will be appreciated that the stops 82-86 may act individually to prevent overdeflection (limit deflection or deformation) of some of the flexures 61-66.

Many variations are possible for the configuration of a stop mechanism beyond the stop mechanism 80 shown in FIGS. 2 and 3. For instance alternatively the mechanism may involve stops or posts that extend inward from the outer part 14, such as from the outer solid portions 52-56, into holes in the inner part 12. Other types of stop mechanisms or means for mechanically limiting the relative travel of the parts 12 and 14, and/or limiting the deformation of the flexures 61-66 are possible, only some of which are described herein. For instance the inner part 12 and/or the outer part 14 may have extensions, ledges, posts, or other structures that engage openings in or through, parts of, or surfaces or edges or other parts of, the other of the parts 12 and 14.

Figure 4:
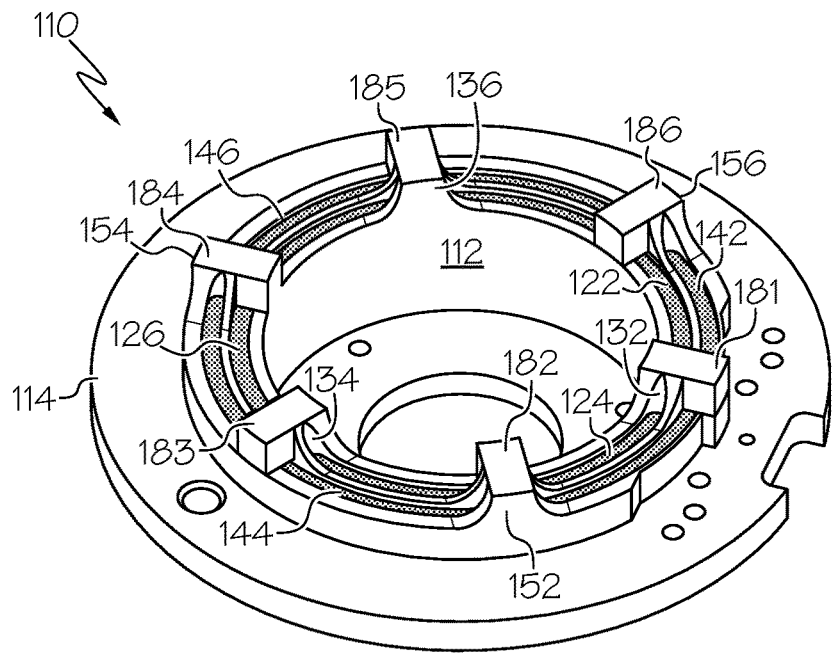
FIG. 4 is an oblique view of a shock isolator according to another embodiment of the disclosure.
Figure 5:
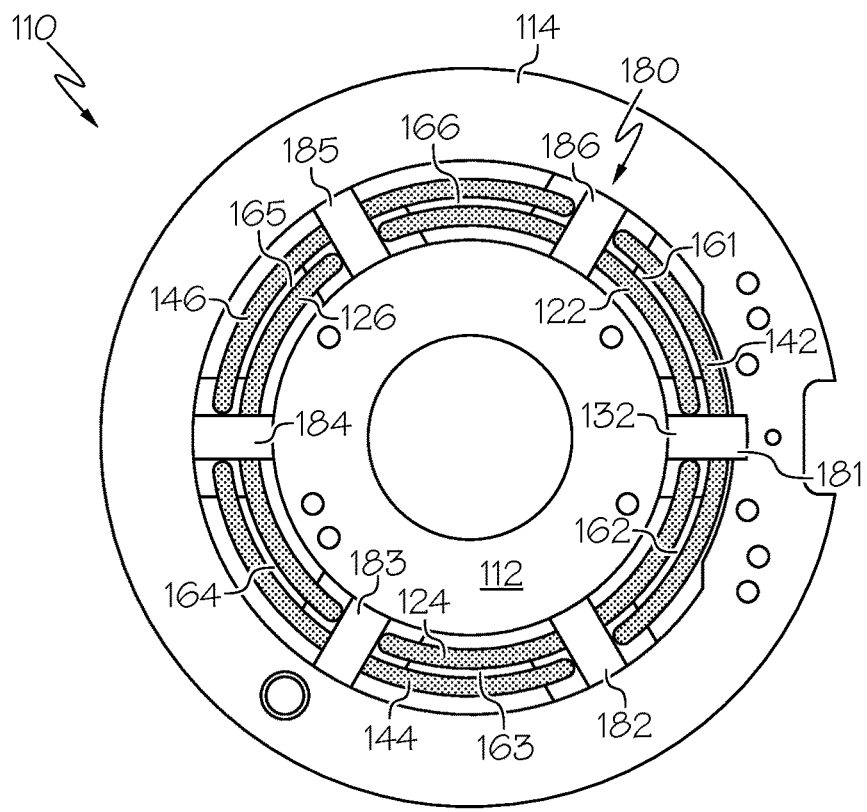
FIG. 5 is a plan view of the shock isolator of FIG. 4.
Figure 6:
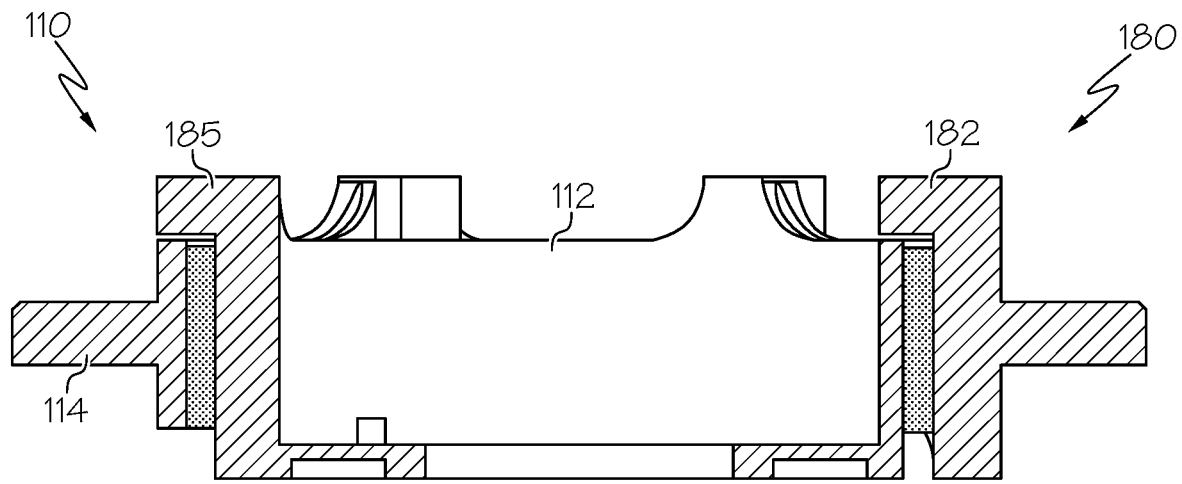
FIG. 6 is a side sectional view of the shock isolator of FIG. 4.

FIGS. 4-6 show another embodiment, a shock isolator 110, which has a stop mechanism 180 for limiting relative displacement between an inner part 112 and an outer part 114. The stop mechanism 180 includes stops 181, 182, 183, 184, 185, and 186, that extend over a series of inner slots 122, 124, and 126, and a series of outer slots 142, 144, and 146. The stops 181-186 limit stresses on flexures 161, 162, 163, 164, 165, and 166, which are defined by the slots 122-126 and 142-146.

The stops 181, 183, and 185 extend outward from inner solid portions 132, 134, and 136, respectively, of the inner part 112. The stops 182, 184, and 186 extend inward from outer solid portions 152, 154, and 156, respectively, of the outer part 114. The stops 181, 183, and 185 limit upward movement of the outer part 114 relative to the inner part 112. The stops 182, 184, and 186 upward movement of the inner part 112 relative to the outer part 114. The stops 181-186 thus limit overall relative movement of the inner part 112 and the outer part 114 in either axial direction. Since the stops 181-186 are also circumferentially spread around the parts 112 and 114, the stops 181-186 also limit relative tilting of the parts 112 and 114.

The limits on movement provided by the stops 181-186 are controlled by the gaps between the stops 181-186 and the underlying portions of the parts 112 and 114 for which the stops 181-186 limit movement. In this regard the sizing and position of the gaps is analogous to the size (height) and positioning of the holes 92-96 (FIG. 2) for the stops or posts 82-86 (FIG. 2).

Figure 7:
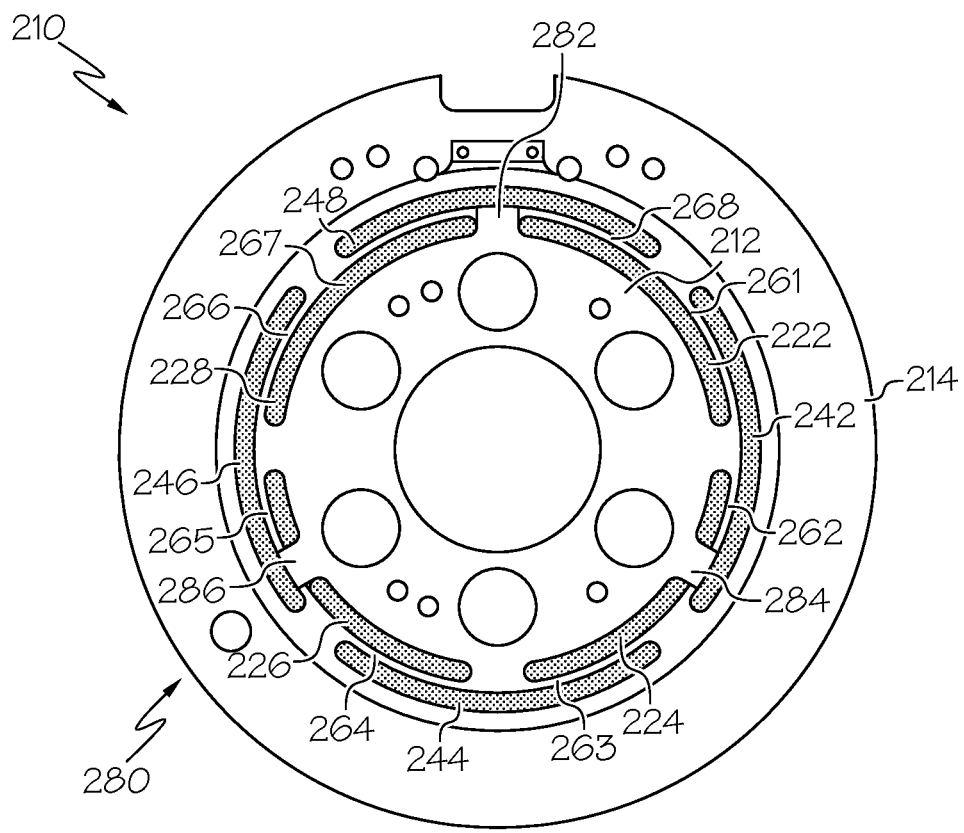
FIG. 7 is a plan view of a shock isolator according to yet another embodiment of the disclosure.

There may be a different number slots and flexures than those in the shock isolator 10 (FIG. 1) and the shock isolator 110 (FIG. 4). FIG. 7 shows a shock isolator 210 with four inner slots 222, 224, 226, and 228, and four outer slots 242, 244, 246, and 248, between an inner part 212 and an outer part 214. The slots 222-228 and 242-248 define flexures 261, 262, 263, 264, 265, 266, 267, and 268. A stop mechanism 280, for example including three ledges 282, 284, and 286 extending outward from the inner part 212, may be used to limit the deflection of the flexures 281-288.

The number of slots may be greater or lesser than those in the various embodiments described herein. The number and arrangement of the elements of the stop mechanism may be greater or lesser than the number of slots extending around a circumference or perimeter.

Figure 8:
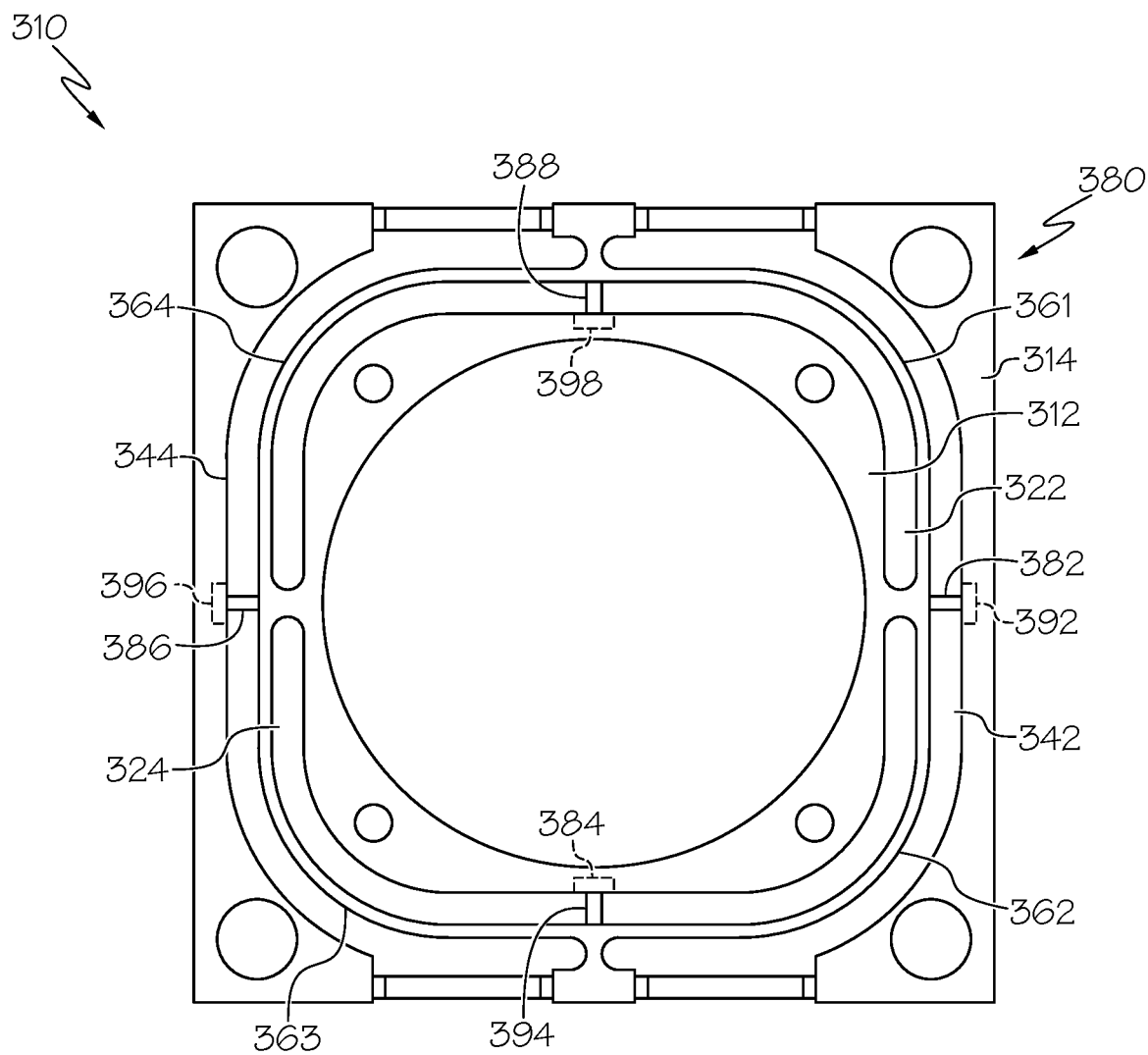
FIG. 8 is a plan view of a shock isolator according to still another embodiment of the disclosure.

FIG. 8 shows another alternative, a shock isolator 310 with rectangular arrays (such as square arrays) of inner slots 322 and 324 and outer slots 342 and 344 between an inner part 312 and an outer part 314. The slots 322, 324, 342, and 344 define flexures 361, 362, 363, and 364. Deflection of the flexures 361-364 may be limited by a stop mechanism 380, such as stops or posts 382, 384, 386, and 388 engaging respective oversized or slotted recesses or holes 392, 394, 396, and 398.

Figure 9:
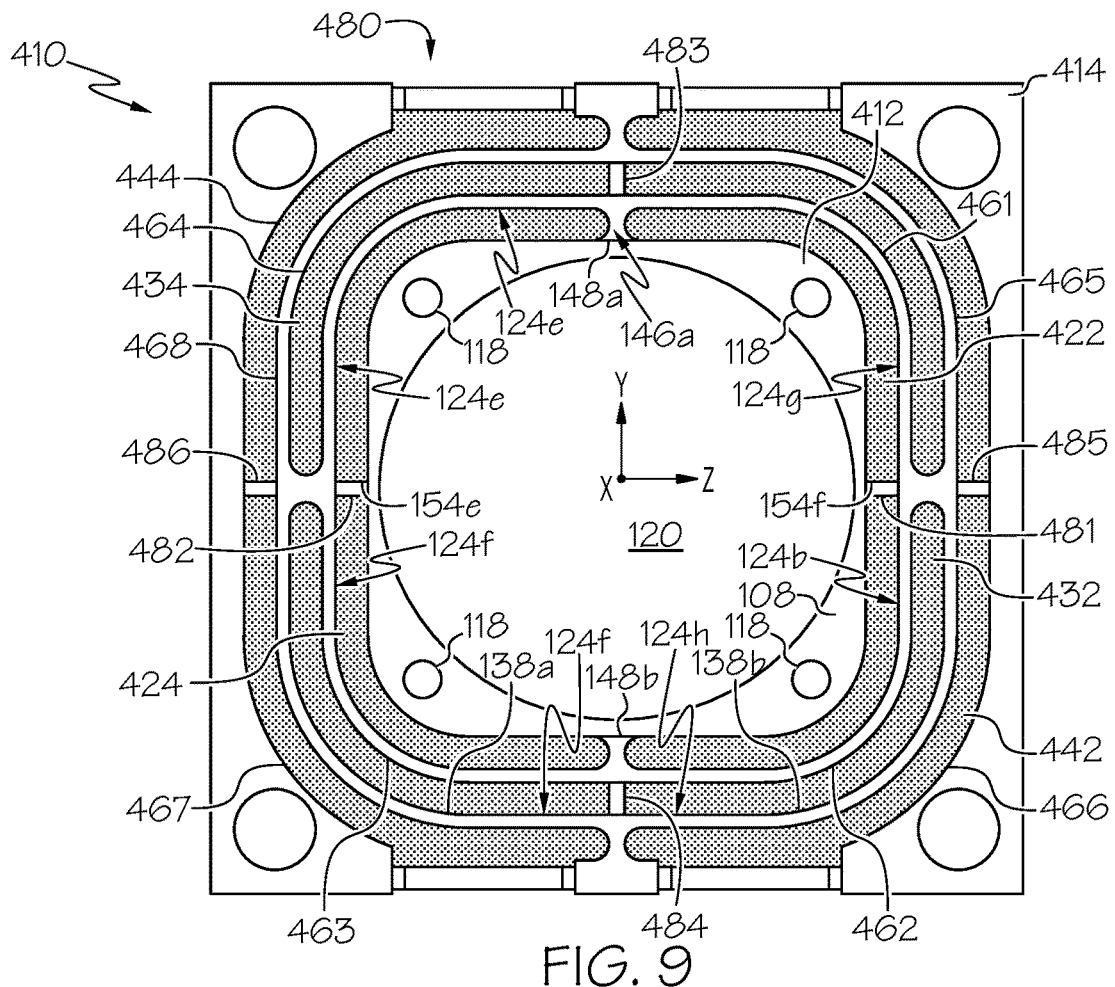
FIG. 9 is a plan view of a shock isolator according to a further embodiment of the disclosure.

FIG. 9 shows a further embodiment, a shock isolator 410 that has three rows of slots, inner slots 422 and 424, middle slots 432 and 434, and outer slots 442 and 444. The slots 422-444 define inner flexures 461, 462, 463, and 464, and outer flexures 465, 466, 467, and 468, between an inner part 412 and an outer part 414. A stop mechanism 480 may include stops or posts 481, 482, 483, 484, 485, and 486, for limiting deflection of the flexures 461-468.

The shock isolators 110, 210, 310, and 410 shown in FIGS. 4-9 may have further characteristics similar to those described above with regard to the shock isolator 10 (FIG. 1). For instance the shock isolators 110, 210, 310, and 410 may have their slots filled with an energy-attenuating or damping material, such as the materials 70 (FIG. 1) described above.

Figure 10:
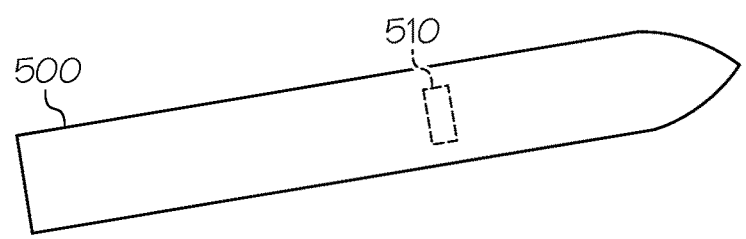
FIG. 10 is a view of a flight vehicle that includes a shock isolator, according to yet another embodiment of the disclosure.

FIG. 10 shows a flight vehicle 500 that includes a shock isolator 510, which may be any of the shock isolators described herein, such as the shock isolators 10, 110, 210, 310, and 410. The flight vehicle 500 may be any of a variety of vehicles subject to shocks and/or vibrations. Examples include missiles or projectiles, such as gun-launched projectiles.

Figure 11:
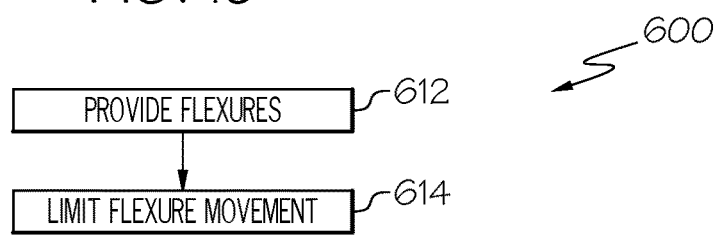
FIG. 11 is a high-level flow chart of a method according to the disclosure.

FIG. 11 shows a high-level flow chart of a method 610 of shock and/or vibration isolation. In step 612 flexures are provided between an inner part and an outer part of a shock isolator. In step 614 stops of the shock isolator are used to limit motion of the flexures.

Shock isolators and methods described herein may have the advantages of improved survivability and/or durability of the flexures involved. This may enable flexures with increased survivability, for instance.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A shock isolator comprising:
   an inner part having inner slots therein;
   an outer part around the inner part, the outer part having outer slots therein;
   flexures between and defined by the outer slots and the inner slots; and
   a first plurality of non-adjustable and permanently affixed stops spaced around the outer part that extend inward from the outer part to over a major surface of the inner part with a gap between the stops and the major surface;
   a second plurality of non-adjustable and permanently affixed stops spaced around the inner part that extend outward from the inner part to over a major surface of the outer part with a gap between the stops and the major surface;
   wherein the first plurality of stops limit upward movement of the inner part relative to the outer part by making contact with the inner part;
   wherein the second plurality of stops limit upward movement of the outer part relative to the inner part by making contact with the outer part;
   wherein the flexures elastically deform in response to acceleration, and wherein elastic deformation of the flexures isolates the inner part from acceleration shocks experienced by the outer part.

2. The shock isolator of claim 1, wherein the first and second plurality of non-adjustable and permanently affixed stops are circumferentially spread around the outer and inner parts, respectively, in an alternating configuration.

3. The shock isolator of claim 1,
   wherein the inner slots are arranged end-to-end around a periphery of the inner part, with inner solid portions of the inner part between adjacent of the inner slots; and
   wherein the outer slots are arranged end-to-end around an inner boundary of the outer part, with outer solid portions of the outer part between adjacent of the outer slots.

4. The shock isolator of claim 3, wherein the inner slots and the outer slots are together circular.

5. The shock isolator of claim 3, wherein the inner slots and the outer slots are together rectangular.

6. The shock isolator of claim 3, wherein the inner slots are perimetrically offset from the outer slots.

7. The shock isolator of claim 6,
   wherein the inner solid portions are opposite middles of the outer slots; and
   wherein the outer solid portions are opposite middles of the inner slots.

8. The shock isolator of claim 1, wherein the inner part includes a cup on the inner part for receiving an object.

9. The shock isolator of claim 1, further comprising damping material in the inner slots and the outer slots.

10. The shock isolator of claim 9, wherein the damping material is an elastomeric material.

11. The shock isolator of claim 1, wherein the isolator is part of a flight vehicle.

* * * * *

UNITED STATES PATENT AND TRADEMARK OFFICE
CERTIFICATE OF CORRECTION

PATENT NO. : 12,297,885 B2
APPLICATION NO. : 17/731723
DATED : May 13, 2025
INVENTOR(S) : Vo et al.

Page 1 of 1

It is certified that error appears in the above-identified patent and that said Letters Patent is hereby corrected as shown below:

In the Specification

In Column 4, Line 28, delete "42-46" and insert --22-26-- therefor

Signed and Sealed this
Twenty-sixth Day of August, 2025

Coke Morgan Stewart
*Acting Director of the United States Patent and Trademark Office*